United States Patent [19]

Scholl et al.

[11] Patent Number: 4,702,626
[45] Date of Patent: Oct. 27, 1987

[54] SEALING ROLLING BEARING

[75] Inventors: Herbert Scholl, Schweinfurt; Uwe Brockmüller, Oberwerrn, both of Fed. Rep. of Germany

[73] Assignee: SKF GmbH, Schweinfurt, Fed. Rep. of Germany

[21] Appl. No.: 940,583

[22] Filed: Dec. 11, 1986

[30] Foreign Application Priority Data

Dec. 19, 1985 [DE] Fed. Rep. of Germany ....... 3544988

[51] Int. Cl.$^4$ .............................................. F16C 33/78
[52] U.S. Cl. .................... 384/477; 384/559; 384/489
[58] Field of Search ............... 384/489, 559, 564, 569, 384/584, 522, 521

[56] References Cited

U.S. PATENT DOCUMENTS

| 2,512,148 | 6/1950 | Gaines | 384/489 |
| 3,892,446 | 7/1975 | Rich | 384/489 |
| 4,336,971 | 6/1982 | Reiter | 384/559 |
| 4,619,534 | 10/1986 | Daly et al. | 384/489 |

Primary Examiner—Lenard A. Footland
Attorney, Agent, or Firm—Rosen, Dainow & Jacobs

[57] ABSTRACT

A sealed rolling bearing has at least one bearing ring with an end surface extending radially thereabout and supporting a support surface that may be positioned to engage the end surface. At least one annular groove is provided in either the support or end surface, having a groove bottom in which an axially compressible sealing ring is assembled. The sealing ring is axially and circumferentially yielding and is arranged either against a radially inner groove wall inclined to extend radially inwardly the groove bottom, or against a radially outer groove wall inclined to extend radially outwardly to the groove bottom.

14 Claims, 4 Drawing Figures

SEALING ROLLING BEARING

This invention relates to a sealed rolling bearing wherein a seal is provided between the end faces of a bearing ring and a support ring.

A sealed rolling bearing of known type has a support ring with a pair of radial support surfaces concentric with the bearing, each support surface having an annular groove in which a sealing ring is axially installed, (DE-OS No. 3324160). One disadvantage of this bearing is that the annular groove and the respective sealing ring must be produced with proportionally small manufacturing tolerance in order that the sealing ring precisely fits in the annular groove. As a result, the assembly of the bearing ring with the respective support rings is relatively difficult, since the sealing ring can easily fall out of the annular groove, and it can become jammed at some positions of its circumference between the support surface and the end surface of the bearing ring. The sealing action of the sealing ring is then insecure.

The present invention is therefore directed to the provision of a sealing arrangement that overcomes the above disadvantage of the prior art. The invention is directed to the provision of a sealed bearing ring of the above type which can be easily assembled in a housing or the like, resulting in a complaint free sealing action and insurance of the seal in the rolling bearing.

In accordance with the invention this objective is achieved by the provision of a bearing arrangement in which the sealing ring is inserted in an annular groove in the end surface of the bearing ring or the support surface of the support ring, such that the sealing ring is tensioned in accordance with its elastic properties with pretension against an inclined inner or outer wall of the annular groove. The sealing ring always presses with a constant force on the groove bottom and against the end of the support surface lying axially opposite the annular groove. A too wide projection of the sealing ring beyond the end or support surface, in which the annular groove is formed, is thereby automatically avoided. As a result the assembly of the support ring also can be effected by unskilled personnel. After the assembly and/or after the insertion of the rolling bearing in a housing or the like the sealing ring assumes a position relative to the support and bearing ring which corresponds accurately to the form of the annular groove. Notwithstanding the unavoidably small manufacturing tolerance with respect to the diameter of the annular groove and sealing ring, the sealing ring is held fast in a play free manner in the annular groove. A damaging undulating deformation of the sealing ring in its annular groove is prevented. It is also prevented that the sealing ring in operation, for example, due to a centrifugal force action on the bearing be eccentrically outwardly extended from its annular groove and thereby unsealed.

In a further feature of the invention, the sealing ring in its desired position of the annular groove is threaded without deformation in the annular groove and finally is stressed or pressed in the circumferential direction and can be snapped into the annular groove.

In order that the invention may be more clearly understood, it will now be disclosed in greater detail with reference to the embodiments thereof shown in the accompanying drawings, wherein FIG. 1 is a longitudinal cross section through a sealed bearing;

Figure 1:
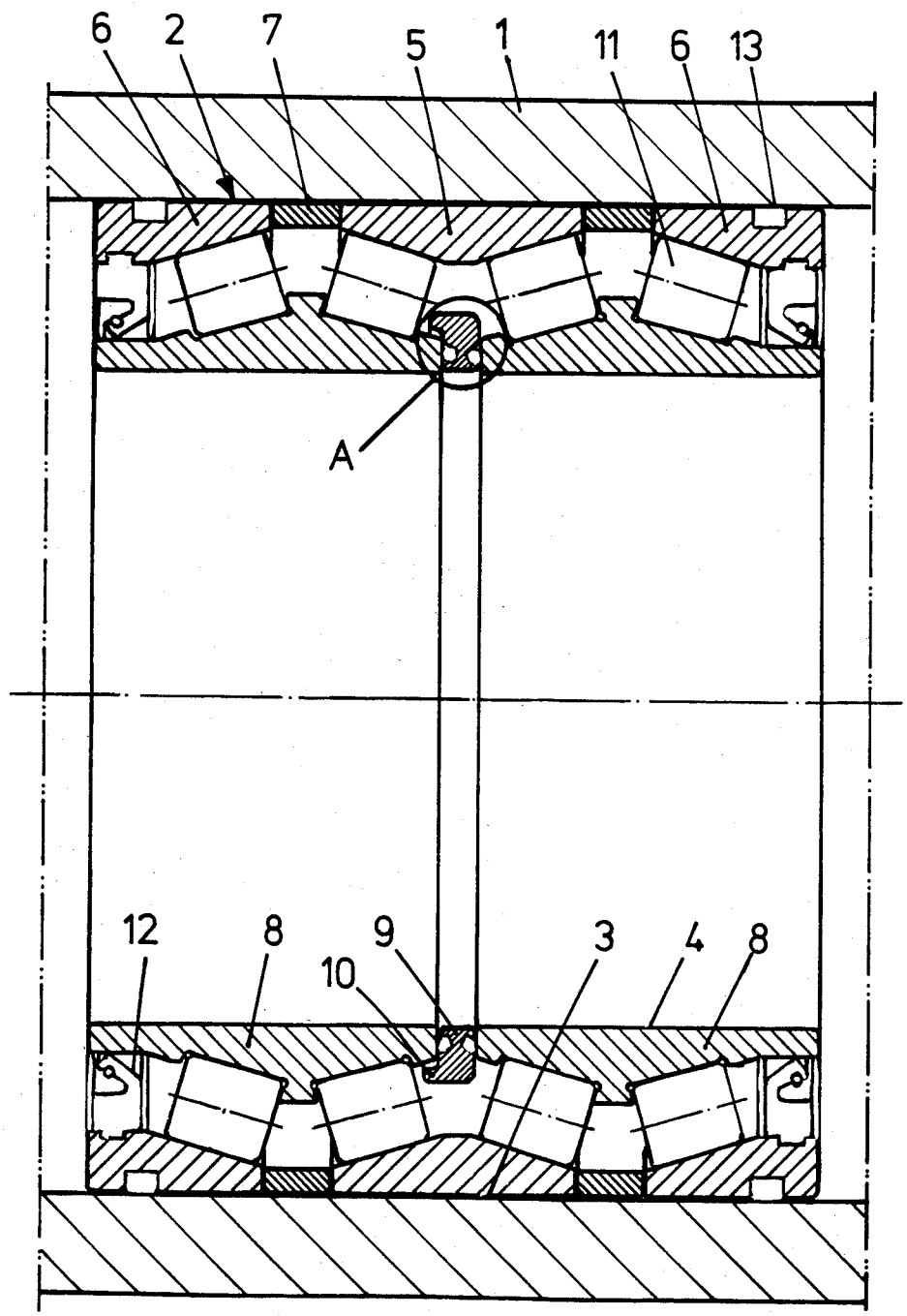

Referring now to the drawings, FIG. 1 illustrates portion 1 of a roll frame (not illustrated), and a four roll tapered roller bearing 2. The tapered rolling bearing 2 is comprised of an arrangement filled with lubricant, such as a lubricating grease, and is insertable in the cylindrical receiving bore 3 of the component 1.

The tapered rolling bearing 2 has a cylindrical bearing bore 4 in which the pin (not illustrated) of an operating roller of the roll frame can be slidably inserted, the operating roller being adapted to be cooled and lubricated in an oil-water emulsion in operation. In a known matter the tapered roller bearing is axially fixed on the pin and in the component 1.

The tapered roller bearing 2 has a central outer ring 5 and an outer ring 6 laterally thereof at each end. An outer spacing ring is fit between each of the end outer rings 6 and the central outer ring 5. The tapered roller bearing 2 moreover has two inner race rings 8, axially between which a central support ring is installed. In this case the support ring 9 has an annular collar 10 extending over the bearing ring 8 on the left side of the drawing of FIG. 1 (and on the right side of the bearing in FIG. 2). This collar 10 inhibits the support ring from falling radially inwardly when the pin of the upgrading roller is removed from the bearing.

Four rolls of tapered roller bearings 11 are arranged between the inner and outer bearing rings, with an outer roll on each axial end being provided between the respective end outer rings 6 and the inner rings 8, and separate inner rolls between the central outer bearing ring 5 and each of the inner bearing rings 8.

A suitable seal 12 is provided at each end of the tapered roller bearing 2 in the bore of the respective outer ring 6, these seals 12 having sealing lips slidably engaging the radial outer surface of the respective bearing rings 8.

Each outer ring 6 has a radial groove 13 encircling its outer surface, and a sealing O-ring of elastic material (e.g. rubber) is inserted in each of the these grooves to provide a seal between the respective outer ring 6 and the bore surface 3 of the roll frame component 1.

Figure 2:
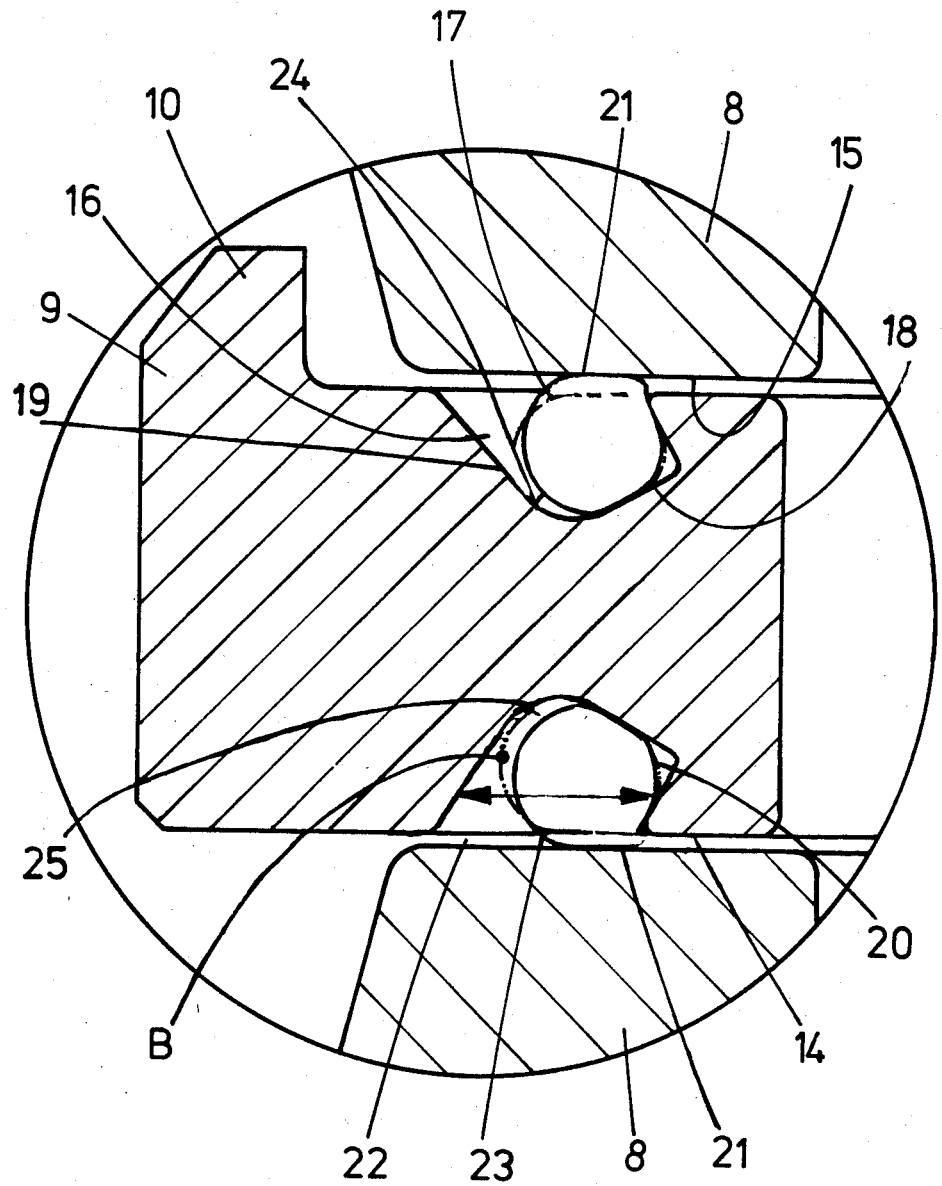
FIG. 2 is an enlarged section of the bearing of FIG. 1 within the circle "A"

As is especially apparent in FIG. 2, the support ring has a radially extending flat support surface 14 extending around each side thereof which opposes a radially extending flat end surface 15 extending around the corresponding bearing rings 8, a narrow gap being illustrated between the surfaces. During the assembly of the tapered roller bearing 2 in the roll frame component 1, the tapered roller bearing having been previously affixed to the respective pin of the work roller (not shown), both support surfaces of the support ring are brought into full contact with the opposite lying end surfaces 15.

A groove 16 is formed in each of the support surfaces 14 concentric to the bearing axis, so that two annular grooves 16 are provided on the support ring 9 laterally symmetric to one another. Each annular groove 16 has in this embodiment of the invention a groove base or bottom 17 extending between a radially inner groove wall 18 and a radially outer groove wall 19, the groove walls 18 and 19 comprising conical surfaces with the wall 19 being parallel to the wall 18. The groove bottom extends at right angles to the inner and outer walls 18 and 19 of the annular groove 16. The groove bottom 17 is hence inclined to the axis of the bearing, with its radially outer end being spaced from the opposing surface 15 a greater distance than its respective inner radial surface.

A circumferentially closed sealing ring 20 is inserted in each annular groove 20, the sealing ring 20 being of an elastic elastomer plastic material and having a circular cross section in its unstressed condition. This sealing ring 20 is elastically compressible not only in the axial direction, but also is elastically extendable in the circumferential direction.

When the sealing ring is installed in the annular groove 16 it stretches radially inwardly against the inclined inner wall 18 and is axially supportive about its circumference on the groove bottom 17. The section 21 of the sealing ring which extends somewhat beyond the support surface 14 comes into contact with the axially opposite surface 15 of the bearing ring 8, so that it sealingly lies with axial prestress about its circumference on the surface 15. During the transport and in the assembly of the tapered roller bearing 2, formed as an assembly and filled with a lubricant material, a smaller distance or gap 22 can be provided between the support surface 14 and the end surface 15 which is bridged over and sealed by the sealing ring 20.

The cross section of the annular groove 16 has a radial height 23 which is constant along the inner wall 18, i.e. the inner wall 18 of the annular groove 16 extends parallel to the radially opposite outer wall 19. This height 23 is of the same size or somewhat greater than the radial thickness of the sealing ring 20 in the unstressed condition thereof. The radial thickness of the sealing ring 20 corresponds in this case to the diameter of the circular cross section of the unstressed sealing ring 20.

A fillet 24 is formed to extend between the inner wall 18 and the respective groove bottom 17, about the annular groove, the fillet 24 having an outer surface with the contour of the sealing ring 20 and spaced a small distance 25 therefrom.

During the fastening of the pin of the operating roller in the bore 4 of the tapered roller bearing 2, the support ring becomes axially clamped between the two end surfaces 15. The sealing ring 20 then takes a position as illustrated in dash dot lines in FIG. 2, and indicated by the reference "A". A radial outer part of the sealing ring 20 is thereby elastically deformed and axially forced into the groove 16, so that the distance 25 between the sealing ring 20 and the fillet 24 is reduced to nil. The sealing ring 20 thereby has an increased contact surface in the annular groove 16 and is relatively stiff in the axial direction.

When the arrangement of the invention is not provided, cooling means (oil-water-emulsion) can leak between the pin of the operating roller and the bore 4 of the tapered roller bearing 2 in operation. The cooling means is thereby hindered by the two sealing rings 20 from reaching the inner space of the tapered roller bearing 2 and causing corrosion damage therein. At the same time the lubricant material in the tapered roller bearing is inhibited from escaping by way of the two sealing rings, so that it cannot escape from the bearing space between the support ring 9 and the two bearing rings 8.

Figure 3:
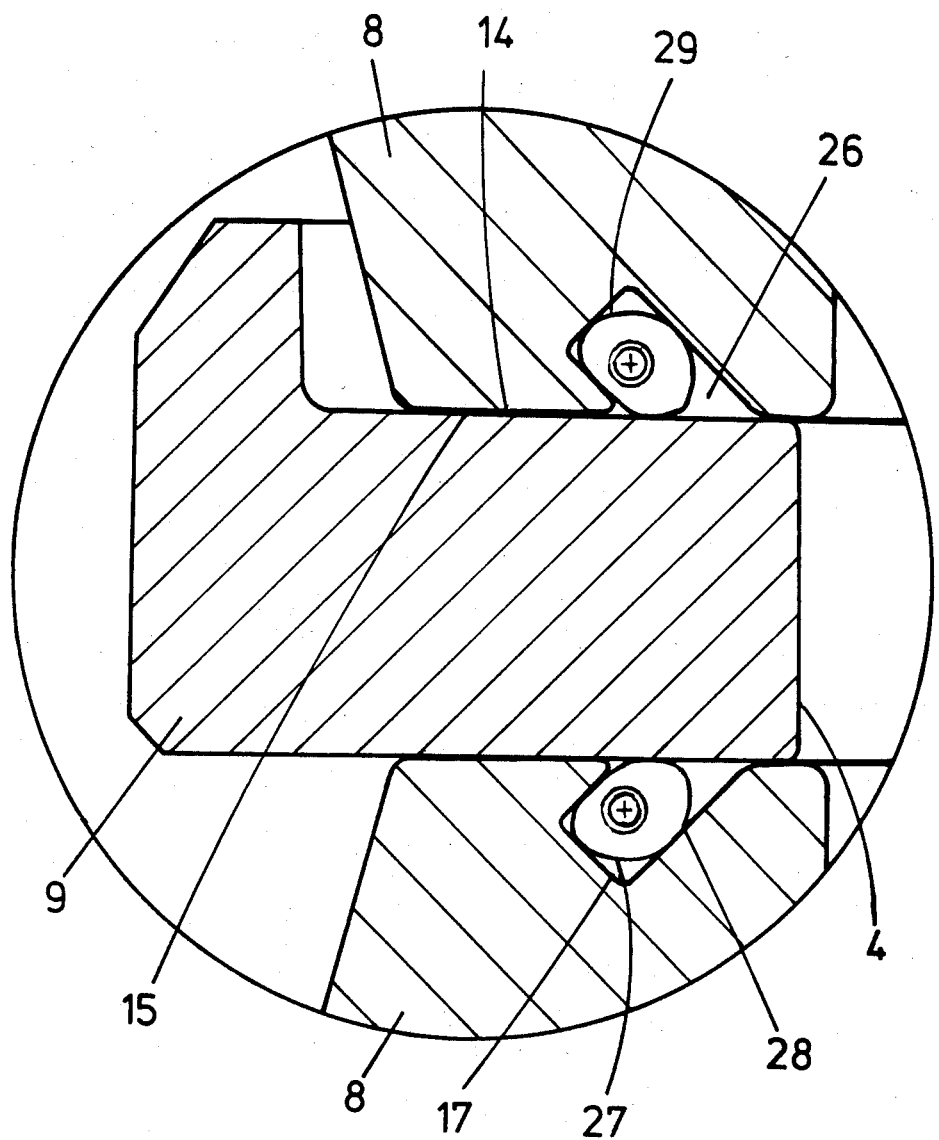
FIG. 3 is a portion of a longitudinal enlarged cross section of a modification of the sealing arrangement of FIG. 2.

FIG. 3 illustrates an enlarged longitudinal cross section through a tapered roller bearing in accordance with another embodiment of the invention, which is similar to that illustrated in FIG. 1. The tapered roller bearing has on the contrary a support ring 9 and an inner bearing ring 8 on each of its two sides. Each bearing ring 8 has a radial end surface 15 extending therearound, which lies opposite the radial end 14 of the support ring 9, and is arranged to be firmly pressed thereagainst.

In this case, however, annular grooves 26 are provided in the end surfaces 15 of each of the two bearing rings 8. Otherwise the annular groove 26 has a radially inclined outer wall 27 extending in an inclined radially outward direction from the respective end surface 15.

The sealing ring 28 is formed by an injection molding process from an elastic plastic material. It is a closed ring and has about its circumference a constant elliptical cross section. The sealing ring 28 is so arranged in each annular groove 26 that it sealingly lies with axial prestress between the groove bottom 17 of the annular groove 26 and the axially opposed support surface 14 of the support 9.

The sealing ring 28 in this case is elastically radially inwarding compressible in the circumferential direction. It has about its circumference an elastically compressible annular coil spring 29 which is incorporated in the sealing ring 28 and thereby fixedly connected with the sealing ring 28.

The sealing 28 presses elastically against the conical inclined outer wall 27 whereby it is supportive axially against the groove based 17.

The pressure of the sealing ring 28 against the outer wall 27 is produced mainly by the annular coil spring 29. In other respects this pressure can yet be increased in operation, for example, if an over pressure occurs in the flowing material in the bore 4 of the tapered roller bearing resulting, for example, in the oil water emulsion required in a steel roller.

The sealing ring 28 is then hydraulically forced against the opposite support surface 14 of the support ring and against the outer wall 27 of the annular groove 26.

Figure 4:
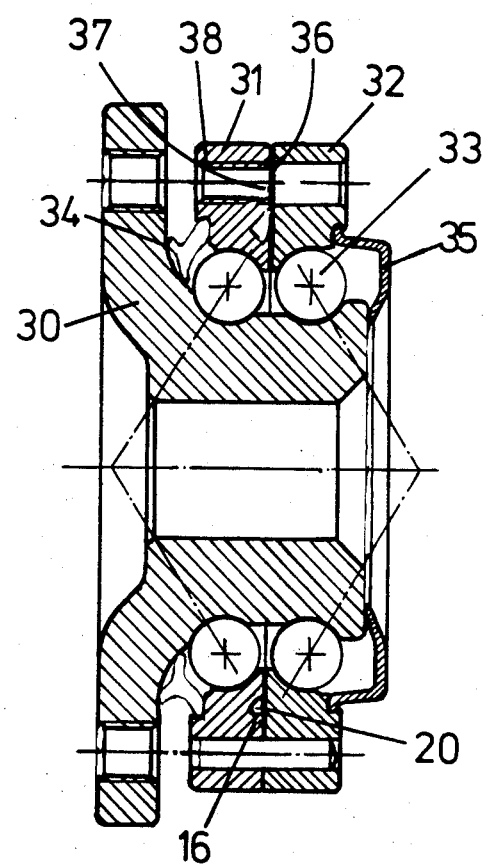
FIG. 4 is a longitudinal cross section of a further modification of a rolling bearing in accordance with the invention.

FIG. 4 illustrates a further embodiment of the roller bearing of the invention, which can be employed as the wheel bearing for a vehicle. The roller bearing is formed as a radial ball bearing. It is comprised of a single part inner ring 30, two concentrically adjacently arranged outer bearing rings 31, 32 and two rows of balls 33. The balls 33 of the two rows have a force action line which in the radially inwardly direction extends away from one another, to provide an O-arrangement.

A sealing ring 34, 35 is provided at the two sides of the rolling bearing in the respective bearing rings 31, 32. The bearing 33 has an inner radially extending end surface 36 extending therearound and the bearing ring 32 has an inner radially extending support surface 37 extending therearound for the end surface. In this case the support ring is integrated in the bearing ring 32 of the rolling bearing. The two bearing rings 31, 32 can be affixed to one another by a head screw (not shown) which is screwed into the threaded bore of the bearing ring 31, so that the end surface 36 of the bearing ring 31 can be fixed against the support surface 37.

An annular groove 16 is formed in the end surface 36 of the bearing ring 31 which, similar to the arrangement of FIG. 2, has a groove bottom extending radially from an inner wall to an outer wall, to be spaced further from the bearing ring 32 and its radially outer end. A circumferentially closed circumferential elastic sealing ring 20 of plastic material is snapped into the annular groove 16, the sealing ring being stretched against the inclined inner wall of the annular groove 16 as a result of its elastic characteristics, to support itself on the groove bottom of the annular groove 16. The sealing ring 20 process has axial prestress against the support surface 37 axially opposite the groove bottom, and thereby provides a seal against the support surface 37.

It is within the scope of the invention that the sealed rolling bearing can have other constructions. For example, an inner annular groove with a smaller diameter can be provided inwardly of a larger diameter of an annular groove in one and the same end surface of the bearing ring and/or the support surface. These two annular grooves, which are arranged to be concentric to another, in each case receive an axially and circumferentially elastically yielding sealing ring. Thus, the inner sealing ring can be arranged to be elastically stressed against a radially inner wall of the groove extending with an incline radially inwardly toward the groove bottom, and the outer sealing ring can be elastically stressed against a radially outer wall of another groove extending with an incline radially outwardly toward the respective groove bottom.

The cross sections of the sealing rings need not be round or elliptical. These rings may have any desired shape, for example having a many edged cross section.

What is claimed is:

1. In a sealed rolling bearing with at least one bearing ring having an annular radially extending end surface, a support ring having an annular radially extending support surface adapted to be brought into operative engagement with said end surface, and a circumferentially closed axially elastic sealing ring inserted in an annular groove in one of said end surface or said support surface that is axially opposite the other of said end surface or support surface, the sealing ring providing sealing contact with axial prestress about its circumference between a bottom surface of said annular groove and the other of said end surface or support surface; the improvement wherein said the sealing ring is also elastically yielding in the circumferential direction, and the annular groove has a groove bottom and a radial wall that is inclined to the bearing axis and extends to said groove bottom, the sealing ring being elastically stressed against said inclined wall of the annular groove.

2. The rolling bearing of claim 1, wherein said wall is a radially inner wall of the annular groove and extends radially inwardly toward said groove bottom.

3. The rolling bearing of claim 1, wherein said wall is a radially outer wall of the annular groove and extends radially outwardly toward said groove bottom.

4. The rolling bearing of claim 1, wherein the annular groove has a cross section whose radial height between the radially inner and outer walls thereof is substantially constant and of the same size or somewhat greater than the radial dimension of the sealing ring in the unstressed condition.

5. The rolling bearing of claim 1, wherein said inclined wall of the annular groove is conical.

6. The rolling bearing of claim 1, wherein said groove bottom of the annular groove extends at right angles to said inclined wall.

7. The rolling bearing of claim 1, wherein the sealing ring has a circular cross section.

8. The rolling bearing of claim 1, wherein the sealing ring is of an elastic material.

9. The rolling bearing of claim 8, wherein a radially outwardly tensible annular coil spring is affixed to the sealing ring and extends throughout the circumference of the sealing ring.

10. The rolling bearing of claim 9, wherein the annular coil spring is incorporated within the elastic material of the sealing ring.

11. The rolling bearing of claim 8, wherein the sealing ring comprises an injection molding ring.

12. The rolling bearing of claim 8, wherein said elastic material is a elastomer.

13. The rolling bearing of claim 1, wherein the sealing ring has an elliptical cross section.

14. The rolling bearing of claim 1, wherein the support ring comprises a race of the rolling bearing.

* * * * *